Feb. 24, 1970 R. C. MALOTT 3,497,277
BEARING LUBRICATION
Filed Sept. 3, 1968
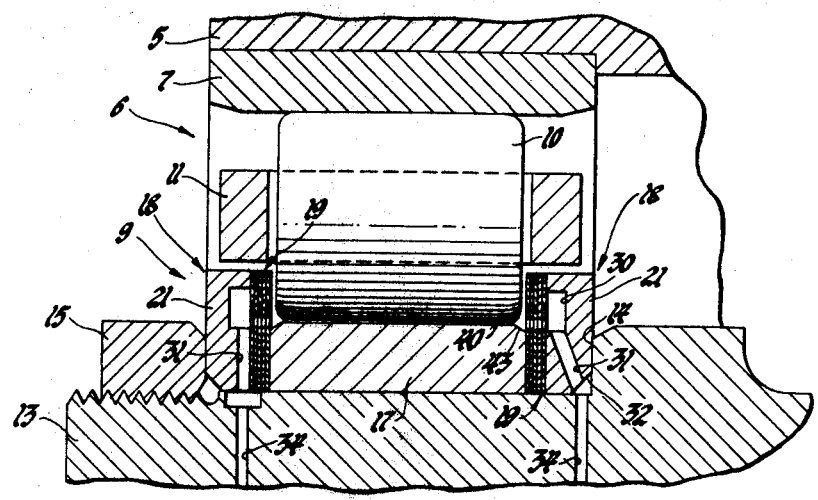
Fig. 1
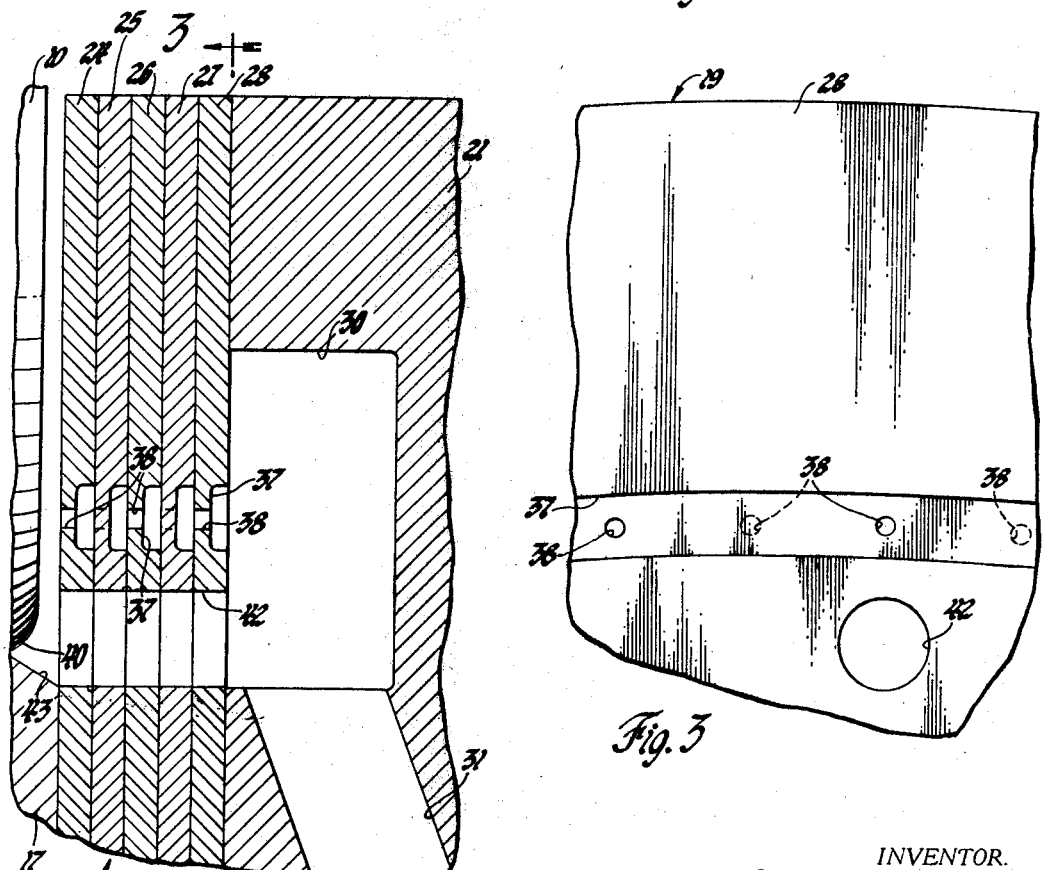
Fig. 2
Fig. 3
INVENTOR.
Richard Clayton Malott
BY
Paul Fitzpatrick
ATTORNEY United States Patent Office 3,497,277
Patented Feb. 24, 1970

3,497,277
BEARING LUBRICATION
Richard Clayton Malott, Nashville, Ind., assignor to General Motors Corporation, Detroit, Mich., a corporation of Delaware
Filed Sept. 3, 1968, Ser. No. 756,892
Int. Cl. F16c 1/24, 33/78
U.S. Cl. 308—187                                    10 Claims

ABSTRACT OF THE DISCLOSURE

A roller bearing having thrust flanges on the inner race includes improved provisions for lubricating the bearing, particularly the contact area between the rollers and the inner race flanges. A ring of porous metal with very small holes distributed closely together around the circumference of the inner race flows oil onto the surface of the flange and ends of the rollers at locations spaced about one degree apart around the bearing axis. A larger hole through the ring jets oil for the lubrication of the rolling contact surfaces of the bearing.

---

The invention herein described was made in the course of work under a contract or subcontact thereunder with the Department of Defense.

My invention relates to rolling contact bearings and particularly to improved means for lubricating roller bearings. Experience with large roller bearings in exacting environments, such as in turbojet and other gas turbine engines, has shown a severe problem in wear of the flange face of the inner race and the ends of the rollers due to the rubbing contact between these rollers and the flange. Since these are large bearings rotating at high speed and the faces to be lubricated are radial, it has proved difficult to establish a sufficient oil film to prevent wear at this point.

The principal object of my invention is to provide a structure presenting a continuous oil film resulting from introduction of oil to the flange face through a multitude of very small pores distributed closely together around the circumference of the bearing. It is a further object of the invention to utilize known techniques of fabricating laminated porous materials to provide a facing for the bearing flange which has the required characteristics of porosity, strength, and resistance to wear.

The nature of my invention and the advantages thereof will be clear to those skilled in the art from the succeeding detailed description of the preferred embodiment of the invention and the accompanying drawings thereof.

FIGURE 1 is an enlarged sectional view of a roller bearing installation taken on a plane containing the axis of the bearing.

FIGURE 2 is a greatly enlarged fragmentary sectional view taken on a plane similar to FIGURE 1.

FIGURE 3 is a greatly enlarged fragmentary sectional view taken on the plane indicated by the line 3—3 in FIGURE 2.

FIGURE 1 illustrates a bearing installation according to my invention. A fixed support 5 mounts a roller bearing 6 including an outer race 7, an inner race 9, a number of rollers 10, and a separator 11. The inner race 9 is mounted on a shaft 13 between a shoulder 14 and a retaining nut 15. The bearing is shown considerably enlarged in this view, but in the particular embodiment described it is a large bearing having an inner race diameter of about four and one-half inches.

The inner race of the bearing in which the novel structure of the invention is incorporated comprises a roller track 17 on which the rollers roll and two side plates or thrust flanges 18. Each side plate comprises an annular oil distributing front ring 19 and a backing ring 21.

FIGURES 2 and 3 show the structure of the side plate to a large scale and more clearly. The front ring 19 is, in the preferred embodiment, a laminated structure made up of five thin metal sheets 24 to 28, inclusive, which are diffusion bonded or otherwise fixed together to form a unitary laminated metal structure of such composition as to be strong and wear-resistant. The backing ring 21, which abuts sheets 28 of the front ring, has machined in it an annular recess which provides a chamber 30 for lubricating oil which is supplied through a radial oil port 31. This port terminates at the inner diameter of the backing ring 21; either at a chamber 32 as shown in the right hand ring of FIGURE 1 or at the cylindrical inner surface as shown in the left hand ring. Oil ports 31 are in communication with a source of oil within the shaft through radial oil passages 34.

Any suitable means may be provided to supply oil to the ports 28, either under pump pressure or merely flowing along the wall of the shaft to the ports to be ejected into the bearing by centrifugal force. Illustrative prior art oil circulating systems for gas turbines may be seen in U.S. patents to Gaubatz et al., No. 2,693,248 for Lubrication System, Nov. 2, 1954; Wheatley, No. 2,804,280 for Turbine Bearing Lubrication System, Aug. 27, 1957; and Atkinson et al., No. 2,964,132 for Lubrication System for a Turbine Engine, Dec. 13, 1960.

The structure of my bearing includes means for providing a large number of very fine oil pores distributed around the front ring 19 to lubricate the interface between this ring and the rollers 10. The reason for having a great number of pores is so that the supply of oil is essentially continuous around the entire side plate. The pores, therefore, must be quite small, as otherwise there would be too great an oil flow from the large number of pores. In the sort of installation described, I prefer to have approximately one pore every degree around the circumference, or a total of 360 pores. With this large number of pores, the diameter of each of approximately two thousandths inch is satisfactory, particularly if the overall structure is such as to throttle to some extent the flow through the pores.

There remains the problem of providing such extremely fine holes through a structure of sufficient strength and rigidity to serve as the end flange and absorb the thrust from the bearing rollers. I have solved this problem by the use of a laminated metal structure involving a number of thin sheets through which very small holes are made by a photoetching process. Also, by the use of a number of such sheets and provision of holes out of register and communicating passages within the sheets, it becomes possible to baffle the flow so that the rate of flow from the small holes is of the order desired. In general, it has been observed that it is possible by photoetching to make a hole through a metal sheet as small in diameter as the thickness of the sheet. In the preferred structure described, the sheets 24 through 28 are each approximately five thousandths inch thick. By using five such sheets, a structure 0.025 inch thick is constructed. Each sheet is formed with an annular recess or groove 37 in its outer face; that is, the face away from the roller. These recesses are from two to three thousandths inch deep so as to leave a wall approximately two thousandths inch thick. Pores two thousandths inch in diameter are etched through the remaining thickness of the sheet adjacent the center line of groove 37 at one degree spacings around the circumference of each ring. The oil in the chamber 30 is under substantial pressure, preferably of the order of 200 pounds per square inch when the shaft is rotating at full speed, this pressure being due to centrifugal force plus whatever the supply pressure referred to the center of the shaft may be. The oil thus flows outwardly through pores 38 in sheet 28 along the groove 37, through holes 38 in sheet 27 and so on, following a tortuous or zigzag path until it is finally discharged through the pores 38 in the innermost sheet 24. Preferably these pores are located so that they are radially opposite the radiused portion 40 of the rollers so that there is no danger of scrubbing of the end face of the roller against the pores 38 in the innermost sheet. Also, it is preferred that chamber 30 extend radially outward of the pores 38 to provide a sludge trap in which impurities in the oil may settle out against the outer wall of the chamber.

Means may also be provided for lubricating the rolling contact between the rollers 10 and the inner and outer races from the oil chambers 30. As shown in FIGURES 2 and 3, a single relatively large oil hole 42 extends axially directly through the five sheets of the front ring 19. In the particular installation, this hole is fifteen thousandths inch in diameter; it provides a jet of oil which enters between the radius 40 of the rollers and the chamfer 43 of the outer end of the roller track. This oil is, of course, splashed outward to the separator and it is carried by the rolling of the bearings to the outer race. More than one such hole could be provided, if desired, but one hole at each end of the bearing is considered to be most desirable. With a relatively large hole there is no significant danger of clogging.

The sludge trap should catch most of the fine particles which might otherwise plug some of the pores 38. In view of the great number of such pores, a certain amount of plugging should be relatively immaterial. Particularly, this is the case since any plugging should be expected to occur in the first or second layers from the outside; and there should be almost no chance of any particle of contaminant large enough to close a pore making its way to the final discharge pores. Moreover, with the very large number of pores, blocking a few would be relatively inconsequential, even in the final discharge sheet 24.

As previously stated, the front ring 19 is preferably made by photoetching and diffusion bonding a number of thin metal sheets of suitable metal, the sort of steel ordinarily employed in bearing races. While the front ring may be fixed in some way to the backing ring 21, preferably it is held in place by being clamped between the backing ring and the roller track. It is located radially by being piloted on the shaft 13.

It will be apparent from the foregoing to those skilled in the art that my invention provides a structure of long life capability because of the improved lubrication of the bearing flange and roller end so that there is minimal wear from the rubbing contact normally occurring in operation of the bearing. It should also be clear that these advantages are attained with a relatively simple and readily fabricated structure easily incorporated into roller bearings of conventional types. The laminated structure is much stronger and more controllable as to porosity than sintered or other random pore structures.

The detailed description of the preferred embodiment of the invention for the purpose of explaining the principles thereof is not to be considered as limiting or restricting the invention, since many modifications may be made by the exercise of skill in the art.

I claim:

1. A roller bearing comprising, in combination, an outer race, an inner race, and a plural number of rollers in rolling contact with the said races, the inner race including a roller track and at least one annular side plate extending radially beyond the roller track and adapted to engage the ends of the rollers in rubbing contact; the side plate comprising an annular oil distributing front ring having an inner face abutting an end of the roller track and a backing ring having an inner face abutting the outer face of the front ring, the backing ring having an annular recess in its inner face defining with the front ring a lubricating oil chamber, and the front ring defining an annular array of numerous closely spaced oil discharge pores for delivering oil from the chamber to the inner face of the ring for lubricating the inner face; and means for conducting oil to the said chamber.

2. A bearing as recited in claim 1 in which the array of pores comprises several hundred pores substantially evenly spaced on a circle.

3. A bearing as recited in claim 1 in which the front ring is a laminate of a plural number of sheets with pores in each sheet and passages parallel to the plane of the sheet connecting pores in adjacent sheets.

4. A bearing as recited in claim 1 in which the annular recess has a substantial part thereof more remote from the axis of the bearing than the oil discharge pores so as to provide a sludge trap.

5. A bearing as recited in claim 1 in which the front ring defines a large port communicating with the lubricating oil chamber for lubricating the rolling surfaces of the bearing.

6. A roller bearing as recited in claim 1 in which the oil distributing ring is made up of a plural number of sheets laminated together, the sheets each having a ring of numerous small pores for flow of oil with pores of adjacent sheets in staggered out-of-register relation, with relief grooves in a face of each sheet providing communication between the pores of adjacent sheets, and with the said oil chamber communicating with the outermost one of said sheets, the innermost one of said sheets flowing oil into the bearing from its ring of pores.

7. A roller bearing as recited in claim 1 in which the pores are approximately 0.002 inch in diameter.

8. An oil distributing structure for a bearing comprising an oil distributing ring made up of a plural number of sheets laminated together, the sheets each having a ring of numerous small pores for flow of oil with pores of adjacent sheets in staggered out-of-register relation, with relief grooves in a face of each sheet providing communication between the pores of adjacent sheets, and means defining an oil chamber for oil under pressure communicating with the outermost one of said sheets, the innermost one of said sheets flowing oil into the bearing from its ring of pores.

9. A structure as recited in claim 8 in which the faces of the sheets extend substantially perpendicular to the axis of the ring.

10. A structure as recited in claim 9 in which the grooves extend radially outwardly from the pores to provide sludge traps.

References Cited

UNITED STATES PATENTS 2,217,801   10/1940   Katchese _____ 308—187

MARTIN P. SCHWADRON, Primary Examiner